Oct. 4, 1966   W. S. SLAYTON   3,276,122
POSITIONING DEVICE
Filed Jan. 3, 1964

INVENTOR.
Welsh S. Slayton
BY
Christel & Bean
ATTORNEYS.

United States Patent Office 3,276,122
Patented Oct. 4, 1966

3,276,122
POSITIONING DEVICE
Welsh S. Slayton, Amherst, N.Y., assignor to Williams Gold Refining Co. Inc., Buffalo, N.Y.
Filed Jan. 3, 1964, Ser. No. 335,488
2 Claims. (Cl. 32—68)

This invention relates generally to the positioning art, and more specifically to a new and useful device particularly adapted for positioning a veneer tooth having a flat lingual surface on a drill press having a cup to receive the tooth, for drilling retentive pin holes in the lingual surface of the tooth. However, its utility is not necessarily limited thereto.

Heretofore, it has been necessary for the dental technician to shape and form veneer teeth for use in fixed crown and bridge work, because no pre-formed veneer teeth have been available for this purpose. Where the reverse pin technique is employed, the technician also has located and drilled the holes into which the metal of the bridge is cast to form retentive pins.

In addition to the time and effort required of the technician in shaping and forming the tooth, a problem is presented should it subsequently be necessary to replace a particular tooth. This is because it is virtually impossible for the technician to accurately locate and drill pin holes in the replacement tooth so as to fit and receive the retentive pins projecting from the cast metal of the bridge.

In my copending application Serial No. 322,911, filed November 12, 1963, I disclose preformed pontic and abutment veneer teeth for fixed crown and bridge prosthesis work. It is a particular feature of my invention, as set forth therein, that the teeth have locating indicia, formed as a part thereof, for indicating to the technician predetermined locations for the pin holes to be drilled.

It is important that the pin holes have an incisal angulation, so that masticatory stresses tend to force the tooth more firmly onto its anchor pins, as distinguished from the situation which would prevail if the holes and pins were gingivally inclined, in which case masticatory stresses would tend to loosen the tooth relative to the pins. This introduces a further problem, when preparing a replacement tooth, in that the pin holes must be drilled at a predetermined angle, as well as at predetermined locations, for the replacement tooth to fit the retentive pins projecting from the bridge.

Accordingly, it is another feature of my aforesaid invention that the teeth have a flat lingual surface, defining a reference plane for use in positioning the tooth, and the primary object of this invention is to provide a device for positioning such a veneer tooth in a drill press with the lingual surface of the tooth having a predetermined inclination, for predetermined angulation of the retentive pin holes.

Another object of this invention is to provide the foregoing in a device which is relatively simple and inexpensive in construction, easily and quickly manipulated, and durable and dependable in operation.

In one aspect thereof, a positioning device constructed in accordance with my invention is characterized by the provision of a shellac cup engaging first surface defining a reference, and a flat tooth receiving second surface disposed at a predetermined angle relative to that reference, whereby engagement of the shellac cup and the positioning device with the flat lingual surface of a veneer tooth against the second surface will position the tooth in the cup with the lingual surface of the tooth inclined for predetermined angulation of pin holes drilled therein.

The foregoing and other objects, advantages and characterizing features of the positioning device of my invention will become clearly apparent from the ensuing detailed description of an illustrative embodiment thereof, considered in conjunction with the accompanying drawing wherein like reference numerals denote like parts throughout, and wherein.

Referring now in detail to the accompanying drawings, there is shown an abutment veneer tooth of my invention, generally designated 1, having a beveled incisal surface 2, a flat lingual surface 3, and having pin hole locating indicia, in the form of dimples 4, in the lingual surface 3. The foregoing tooth construction is described in detail in my aforesaid copending application, to which reference is hereby made for such details.

Figure 1:
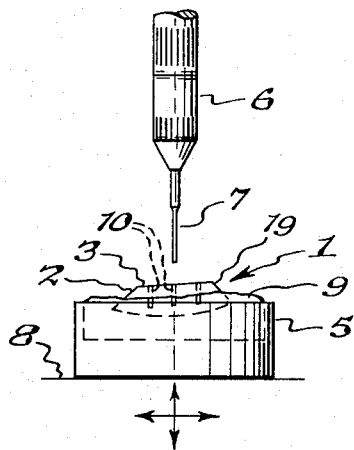
FIG. 1 is a schematic, side elevational view of a drill press, with a veneer tooth of my invention positioned therein, the tooth having been drilled, part of the drill holder being broken away for convenience in illustration.
Figure 4:
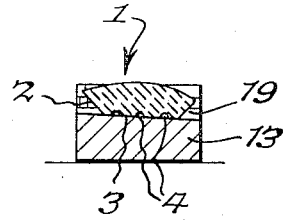
FIG. 4 is a vertical sectional view of the positioning device of my invention, being taken about on line 4—4 of FIG. 6, with a veneer tooth of my invention arranged therein for being positioned thereby in a shellac cup.
Figure 2:
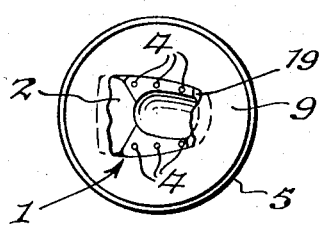
FIG. 2 is a top plan view of the shellac cup thereof, showing the tooth therein prior to drilling.

The preformed veneer tooth thus described is intended to be positioned in the shellac cup 5 of a drill press, which in the illustrated embodiment has an overhead drill indicated at 6 with a bit 7 driven by a motor, not shown. Cup 5 is mounted for both vertical and horizontal movement, as indicated by the arrows in FIG. 1, by means not shown but merely indicated in the form of supporting surface 8. It will be understood that the mounting means indicated by supporting surface 8 can impart both vertical and horizontal movement to the cup, or only vertical movement with the cup being horizontally movable relative thereto, as may be desired. Various drill presses are suitable for the intended purpose, one such being the Precision Drill Press made by Williams Gold Refining Co. Inc., 2978 Main Street, Buffalo 14, New York.

In practice, tooth 1 is positioned in cup 5, which contains shellac 9 receiving and retaining the tooth. The cup is shifted horizontally, to position the indicia 4 below the drill 7, and then vertically for drilling retentive pin holes therein as indicated at 10 in FIG. 1. Thereafter, the lingual gold 11 is cast, in a manner known to the art, to form retentive pins 12 entering the holes 10 when the tooth is cemented in place.

Figure 3:
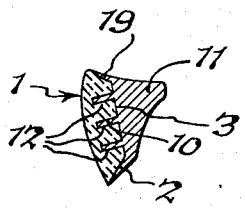
FIG. 3 is a vertical sectional view of a veneer tooth of my invention with lingual gold cast thereagainst.
Figure 6:
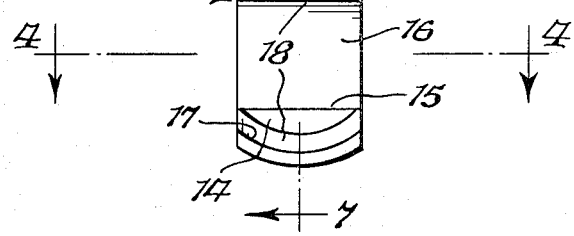
FIG. 6 is a top plan view of the positioning device.
Figure 7:
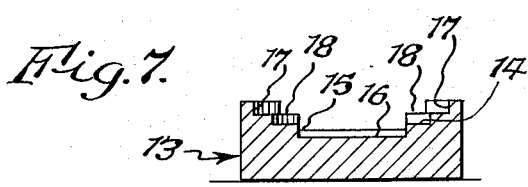
FIG. 7 is a vertical sectional view thereof, taken about on line 7—7 of FIG. 6.

It will be seen that locating indicia 4 insures drilling of pin holes 10 precisely at predetermined locations. However, predetermined angulation also is necessary, to achieve the desired incisal angulation shown in FIG. 3 and to insure that a replacement veneer tooth will have the same angulation as the previously formed retentive pins 12. This is accomplished by using a positioning device of my invention, as illustrated at 13 in FIGS. 4–7.

Positioning device 13 comprises a body, herein shown as being cylindrical with flat opposite side surfaces, having a normally horizontal upper surface 14. A diametral groove 15 extends across the body, in the upper surface 14 thereof, and has a flat bottom surface 16 inclined at a predetermined angle to the horizontal. In practice, this inclination can be quite small, as for example on the order of 2½°. In the drawing, the inclination has been exaggerated, for greater clarity and ease of illustration.

Figure 5:
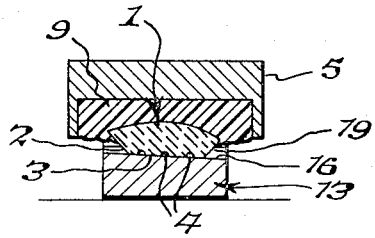
FIG. 5 is a corresponding view thereof, showing the shellac cup engaged therewith for transferring the tooth from the positioning device to the shellac cup.

Positioning device 13 has opposed, semi-circular walls 17, upstanding from surface 14 on opposite sides of groove 15. Walls 17 define a socket, receiving and closely fitting shellac cup 5, as shown in FIG. 5. In addition, the walls 17 are internally stepped, to provide a pair of semi-circular, normally horizontal, inwardly offset shoulders 18 against which the shellac cup abuts when it is inserted in the socket defined by walls 17. The upper surfaces of shoulders 18 define a reference plane, parallel to the normally horizontal surface 14, and position the cup to receive the tooth with a predetermined lingual inclination of the latter. Groove 15 is so arranged that the veneer tooth 1, positioned therein, projects upwardly into the socket defined by walls 17, for engagement with the shellac 9 in cup 5.

In use, a tooth 1 is positioned with its flat lingual surface 3 resting on the flat bottom wall 16 of groove 15, and with its beveled incisal surface 2 facing upwardly, in the groove, and its gingival end 19 facing downwardly. Cup 5, containing relatively soft shellac, is inserted in the socket defined by walls 17, and against shoulders 18 to partially encompass tooth 1 which becomes embedded in the shellac. Upon separation of cup 5 and device 13, the tooth 1 will be held by the shellac 9 which then is cooled, to set the shellac. The cup then is returned to the drill press, for drilling. While FIG. 5 shows cup 5 inverted over positioning device 13, the latter also can be inverted over the former. Often they will be brought together with the cup held in one hand and the device held in the other. When required, the tooth can be lightly held in the device by tacking it at its corners using sticky wax or other suitable adhesive.

Because groove wall 16 has a predetermined inclination to the horizontal surface of shoulders 18, the lingual surface 3 of the tooth will have a predetermined inclination from the horizontal, when the tooth is transferred to the cup in the manner described above, the angle of inclination being the same as the angle of inclination of the bottom wall 16. Because incisal surface 2 is uppermost in the device, it will be lowermost in the shellac cup, whereby the tooth will have a predetermined incisal angulation in every instance. This, together with locating indicia 4, insures that the pin holes 10 drilled in the tooth will have a predetermined location and a predetermined angulation, which can be readily duplicated by the technician, in every instance.

The open-ended formation of grooves 15, and the spaces between walls 17 and shoulders 18, facilitate manipulation and cleaning of the device.

Accordingly, it is seen that my invention fully accomplishes its intended objects. While I have described in detail only one embodiment thereof, that has been done by way of illustration, it being my invention to include within the scope of the appended claims all those modifications and variations which will naturally occur to persons skilled in the art without departing from the spirit of my invention.

Having fully disclosed and completely described my invention, and its mode of operation, what I claim as new is:

1. A device for positioning a veneer tooth having a flat lingual surface on a drill press having a cup to receive the tooth for drilling retentive pin holes in the lingual surface thereof, said device comprising a body having a normally horizontal upper surface, a diametral groove in said upper surface, said groove having a flat bottom wall inclined relative to said upper surface, opposed semi-circular upstanding walls on said body on opposite sides of said groove, said walls defining a cup receiving socket and having an internal shoulder parallel to said surface for receiving a cup thereagainst.

2. A device as set forth in claim 1, wherein said body is of generally cylindrical form having generally flat opposite side surfaces across the opposite ends of said groove, said groove being open at said opposite ends thereof.

References Cited by the Examiner

UNITED STATES PATENTS

| | | | |
|---|---|---|---|
| 833,598 | 10/1906 | Hansen | 287—103 |
| 1,126,365 | 1/1915 | Bode | 269—303 |
| 1,706,980 | 3/1929 | Levy | 32—68 |
| 1,766,235 | 6/1930 | Wells | 32—68 |
| 1,771,327 | 7/1930 | Dehne | 32—68 |
| 2,991,668 | 7/1961 | Keller | 77—62 |

RICHARD A. GAUDET, *Primary Examiner.*

J. W. HINEY, *Assistant Examiner.*